United States Patent
Hyde et al.

(10) Patent No.: US 10,089,798 B2
(45) Date of Patent: Oct. 2, 2018

(54) VEHICLE WITH VARIABLE POSITION AJAR SENSOR

(71) Applicants: Stephen L Hyde, Clarkston, MI (US); Michael W Sulkowski, Commerce Township, MI (US)

(72) Inventors: Stephen L Hyde, Clarkston, MI (US); Michael W Sulkowski, Commerce Township, MI (US)

(73) Assignee: FCA US LLC, Auburn Hills, MI (US)

( * ) Notice: Subject to any disclaimer, the term of this patent is extended or adjusted under 35 U.S.C. 154(b) by 5 days.

(21) Appl. No.: 15/337,230

(22) Filed: Oct. 28, 2016

(65) Prior Publication Data

US 2018/0122164 A1     May 3, 2018

(51) Int. Cl.
*G07C 5/08* (2006.01)
*G01D 5/165* (2006.01)
*G07C 9/00* (2006.01)

(52) U.S. Cl.
CPC ........... *G07C 5/0808* (2013.01); *G01D 5/165* (2013.01); *G07C 9/00* (2013.01)

(58) Field of Classification Search
CPC .......... E05B 77/54; B60R 25/01; G08B 21/02
USPC ................... 701/46, 49; 340/457.1; 318/445; 187/316, 317
See application file for complete search history.

(56) References Cited

U.S. PATENT DOCUMENTS

| | | | |
|---|---|---|---|
| 5,039,925 A | 8/1991 | Schap | |
| 5,841,356 A | 11/1998 | Woodruff et al. | |
| 5,998,746 A * | 12/1999 | Clark | H01H 3/166 200/286 |
| 7,503,434 B2 * | 3/2009 | Grundmann | B66B 13/14 187/316 |
| 8,405,337 B2 * | 3/2013 | Gebhart | H02P 6/085 318/400.01 |
| 8,983,732 B2 | 3/2015 | Lisseman et al. | |
| 9,290,146 B2 * | 3/2016 | Breed | B60R 21/01536 |
| 2008/0271956 A1 | 11/2008 | Flynn et al. | |
| 2011/0257796 A1 | 10/2011 | Burris et al. | |
| 2014/0253314 A1 * | 9/2014 | Rambadt | B60N 2/002 340/457.1 |
| 2015/0159401 A1 * | 6/2015 | Patrick | G07C 9/00571 292/137 |
| 2015/0321568 A1 * | 11/2015 | Kinser | B60L 11/1818 701/49 |

(Continued)

*Primary Examiner* — Thomas G Black
*Assistant Examiner* — Wae Lenny Louie
(74) *Attorney, Agent, or Firm* — Ralph E. Smith

(57) ABSTRACT

An automotive vehicle has at least one access cover movable between first and second positions and a variable position ajar sensor that senses a position of the access cover. An electronic control unit has a normal mode and a learn mode. In the normal mode, the electronic control unit is responsive to a position of the access cover sensed by the variable position ajar sensor and determines that the access cover is closed when the sensed position matches a stored closed position stored in memory of the electronic control unit and that the access cover is ajar when the sensed position does not match the stored position. In the learn mode, the electronic control unit is responsive to a position of the access cover sensed by the variable position ajar sensor and stores that position in the memory of the electronic control unit as the stored closed position.

4 Claims, 2 Drawing Sheets

(56) References Cited

U.S. PATENT DOCUMENTS

| | | | |
|---|---|---|---|
| 2016/0002959 A1* | 1/2016 | Javadzadeh | E05B 77/12 |
| | | | 701/46 |
| 2017/0030118 A1* | 2/2017 | Elie | B60Q 9/00 |
| 2017/0030126 A1* | 2/2017 | Elie | E05F 15/614 |
| 2017/0148286 A1* | 5/2017 | Peterson | G08B 13/08 |
| 2017/0193724 A1* | 7/2017 | Johnson | G08B 13/08 |
| 2017/0357246 A1* | 12/2017 | Herthan | G05B 19/416 |

* cited by examiner

VEHICLE WITH VARIABLE POSITION AJAR SENSOR

The present invention relates to automotive vehicles having a variable position ajar sensor that is settable via a user input.

BACKGROUND

Modern automotive vehicles have a variety of different access covers that are movable between open and closed positions. The access covers when in their open positions provide access to various portions of the vehicles. Examples of access covers as the term "access cover" is used herein include, but are not limited to, doors, hoods, trunks and lift-gates.

The vehicle typically has an ajar switch for each access cover that has a set of contacts that are in one state (open or closed) when the access cover is closed and an opposite state (open or closed) when the access cover is ajar. Such a switch typically includes a mechanical adjustment to compensate for varying build conditions where the access cover, from vehicle to vehicle, has a different closed position. The mechanical adjustment moves to the closed position. This is typically a one-time adjustment. If the access cover is then later adjusted so that the closed position is moved toward the ajar position, the adjusted switch may no longer detect that the access cover is closed as it doesn't travel to the closed position to which it was originally adjusted when the access cover is closed. An example of such a switch is described in U.S. Pat. No. 5,998,746 for "Self-Adjust Door Ajar Switch."

SUMMARY

In accordance with an aspect of the present disclosure, an automotive vehicle has at least one access cover movable between first and second positions and a variable position ajar sensor that senses a position of the access cover at least along a path between the first position and a third position that is between the first and second positions. An electronic control unit has a normal mode and a learn mode. The electronic control unit when in the normal mode is configured to respond to a position of the access cover sensed by the ajar sensor by comparing the sensed position to a stored closed position stored in a memory of the electronic control unit and determine that the access cover is closed when the sensed position matches the stored position and that the access cover is ajar when the sensed position does not match the stored position. The electronic control unit when in the learn mode is configured to respond to a position of the access cover sensed by the ajar sensor by storing that position in the memory of the electronic control unit as the stored closed position. The electronic control unit is configured to be responsive to a user input to transition between the normal mode and the learn mode.

In an aspect, the user input is a diagnostic command received on a communications bus of the vehicle to which the electronic control unit is coupled to transition from the normal mode to the learn mode. In an aspect, the user input is a signal from a user actuated switch coupled to the electronic control unit.

In an aspect, the variable position ajar sensor includes a variable resistor having a wiper electrically coupled to the electronic control unit and mechanically coupled to the access cover that moves in response to movement of the access cover wherein a resistance of the variable resistor varies in response to movement of the access cover wherein the resistance of the variable resistor is indicative of the position of the access cover.

In an aspect, the variable position ajar sensor includes a variable resistor having a wiper electrically coupled to a pass through electronic control unit and mechanically coupled to the access cover that moves in response to movement of the access cover wherein a resistance of the variable resistor varies in response to movement of the access cover wherein the resistance of the variable resistor is indicative of the position of the access cover. The pass through electronic control unit is configured to send a message that includes the sensed position to electronic control unit that has the normal and learn modes via a communication bus to which the electronic control units are coupled.

BRIEF DESCRIPTION OF THE DRAWINGS

The present invention will become more fully understood from the detailed description and the accompanying drawings, wherein.

DETAILED DESCRIPTION

Figure 1:
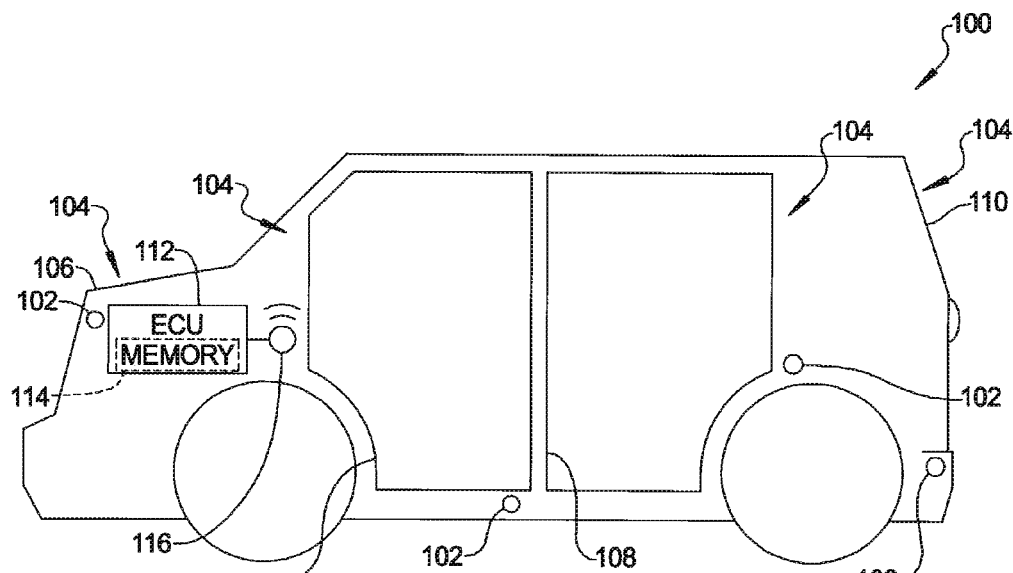
FIG. 1 is a simple diagrammatic view of an automotive vehicle having a variable position ajar sensor in accordance with an aspect of the present disclosure.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

FIG. 1 is a simplified diagrammatic view of an automotive vehicle 100 in accordance with an aspect of the present disclosure having a plurality of access covers 104 and a variable position ajar sensor 102 associated with each access cover 104. Each variable position ajar sensor 102 is situated in vehicle 100 to sense whether its associated access cover 104 is closed or ajar. Illustratively, access covers 104 include hood 106, vehicle doors 108 and rear access cover 110 which in the example shown in FIG. 1 is a lift-gate. In automotive vehicles having trunks instead of lift-gates, rear access cover 110 is a trunk lid.

Figure 2A:
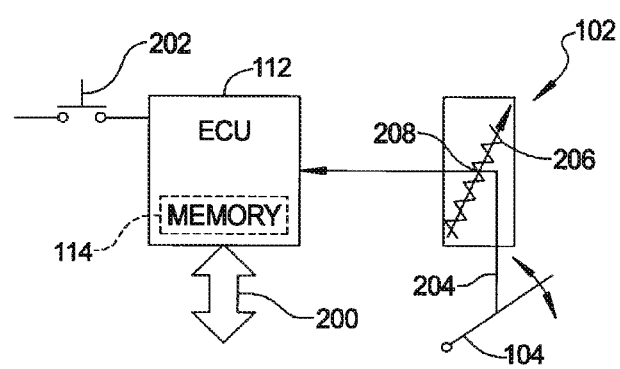
FIG. 2A is a simple diagram of a of circuit topology of a variable position ajar sensor coupled to an electronic control unit in accordance with an aspect of the present disclosure.

Each variable position ajar sensor 102 is coupled to an electronic control unit 112, as shown in more detail in FIG. 2A. In an aspect, vehicle 100 has a separate electronic control unit 112 for each variable position ajar sensor 102, with only one such electronic control unit 112 shown in FIG. 1. In an aspect, all the variable position ajar sensors 102 are coupled to the same electronic control unit 112. In an aspect, vehicle 100 has a plurality of electronic control units 112 with one more of variable position ajar sensors 102 coupled to each of the electronic control units 112. In an aspect, the electronic control unit 112 to which the variable position ajar sensor is coupled communicates to one or more other electronic control units 112 via a communications bus (200), such as a controller area network (CAN) bus.

Each variable position ajar sensor 102 senses a position of the access cover 104 with which that variable position ajar sensor is associated and provides an input signal to the electronic control unit 112 to which that variable position ajar sensor is coupled indicative of the sensed position of the access cover. In an aspect, the electronic control unit 112 to which the variable position ajar sensor is coupled is configured to operate in a normal mode in which it compares the position sensed by the variable position ajar sensor to a stored closed position stored in a memory 114 (FIG. 2) of electronic control unit 112 and determines that the access cover 104 is closed when the sensed position matches the stored closed position and that the access cover 104 is ajar when the sensed position does not match the stored closed position. In this regard, the sensed position is considered as matching the stored closed position when they match each other within acceptable tolerances, which may illustratively be determined heuristically. In an example, acceptable tolerances are +/−5%.

Electronic control unit 112 is also configured to operate in a learn mode to obtain the stored closed position that is stored in memory 114. The access cover 104 is moved to its closed position, which is where the access cover is mechanically closed to vehicle 100. The closed position is typically between the first and second positions, but could be at the first position. Illustratively, electronic control unit 112 transitions to the learn mode in response to a learn command. When in the learn mode, the electronic control unit 112 reads the signal provided by the variable position ajar sensor (102) and stores this signal in memory as the stored closed position. In an aspect, this signal is processed by electronic control unit 112 before being stored in memory 114 as the stored closed position, such as being digitized and the digitized value being stored. In such aspect, the signal from the variable position ajar sensor 102 when electronic control unit 112 is operating in a normal mode is processed in the same manner. In an aspect, the learn command that causes electronic control unit 112 to read the signal from the variable position ajar sensor 102 is a diagnostic command received by electronic control unit 112 via communication bus 200 (FIG. 2) to which electronic control unit 112 is coupled. In an aspect, the learn command is a user input via a user actuated switch 202 (FIG. 2) coupled to electronic control unit 112, such as a push-button switch.

Variable position ajar sensor 102 can be any type of sensor that senses the position of access cover 104 along a path of travel from a first position to a second position. Illustratively, access cover 104 moves an actuator 204 (FIG. 2) coupled to variable ajar sensor 102 as access cover moves which varies the position signal provided by variable position ajar sensor 102 to electronic control unit 112 (or electronic control unit 112' in the variation of FIG. 2B).

In an aspect as shown in FIG. 2A, variable position ajar sensor 102 has a variable resistor 206 having a wiper 208 electrically coupled to electronic control unit 112 (or electronic control unit 112' in the variation of FIG. 2B) and mechanically coupled to actuator 204. As access cover 104 moves, actuator 204 moves wiper 208 which changes a voltage at wiper 208, with this voltage provided to electronic control unit 112 as the position signal sensed by variable position ajar sensor 102.

Figure 2B:
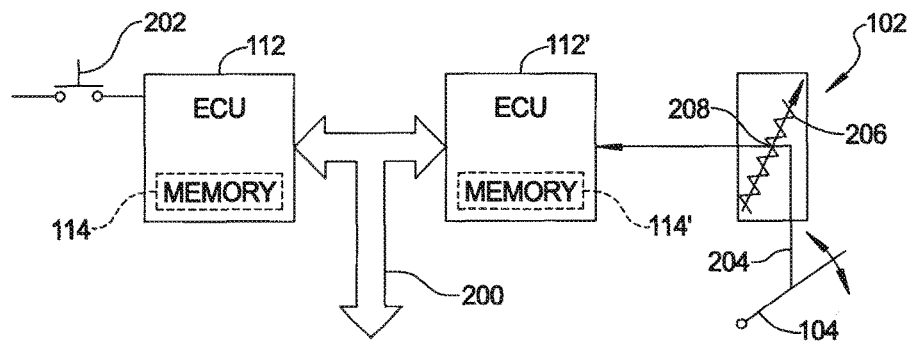
FIG. 2B is a variation of the topology of FIG. 2A in which the variable position ajar sensor is coupled to a pass through electronic control unit.

With reference to FIG. 2B, in a variation the variable position ajar sensor 102 is coupled to a pass through electronic control unit 112' (having memory 114') which is configured to read the input signal from the variable position ajar sensor 102 (such as digitizing this input signal) and send a CAN message over the CAN bus 200 to electronic control unit 112 that includes the value of the read input signal. In an aspect, pass through electronic control unit 112' is a body controller electronic control unit of vehicle 100 and electronic control unit 112 having the normal and learn modes is an engine control electronic control unit of vehicle 100.

Figure 3:
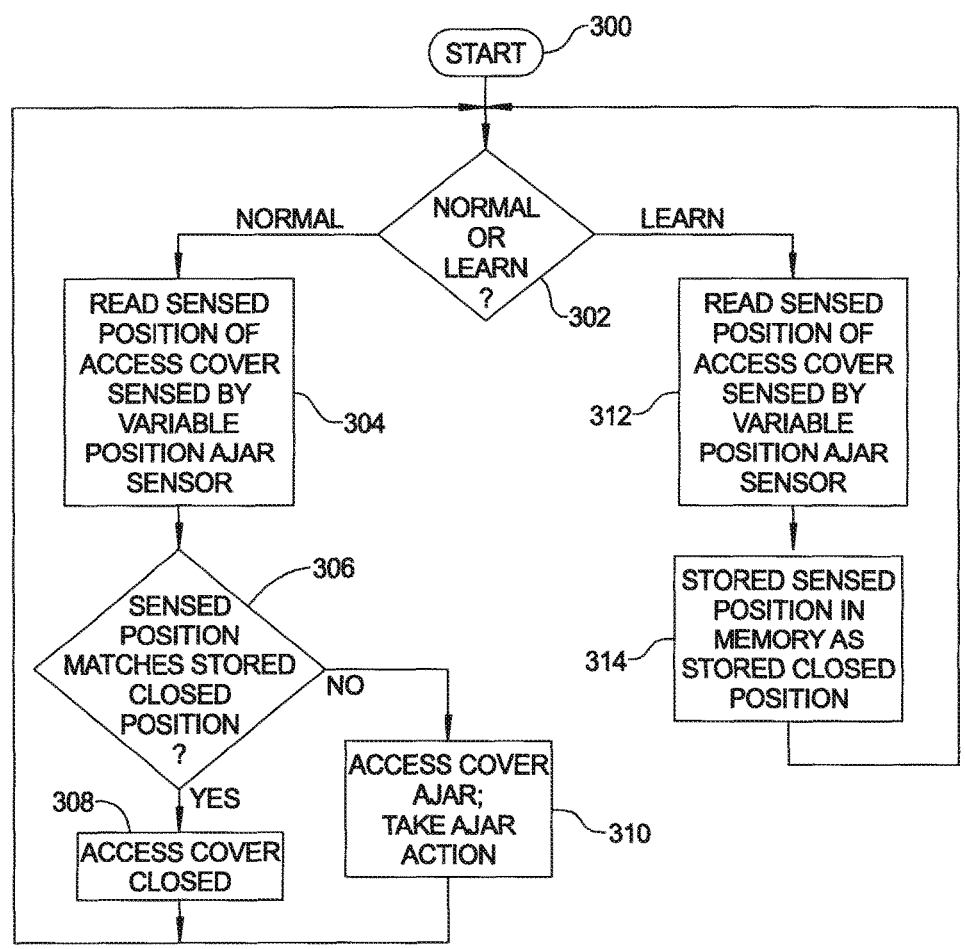
FIG. 3 is a flow chart of simplified control logic for a control routine in accordance with an aspect of the present disclosure for an electronic control unit to which the ajar sensor is coupled determining whether the access cover is closed.

FIG. 3 is a flow chart of illustrative control logic for a control routine for electronic control unit 112 in its normal and learn modes. The control routine starts at 300 and proceeds to 302. At 302, the control routine checks whether the electronic control unit 112 is in its normal mode or learn mode. If electronic control unit 112 is in its normal mode, the control routine branches to 304 where it reads the sensed position of the access cover 104 sensed by the associated variable position ajar sensor 102 and then proceeds to 306. (It should be understood that in the variation of FIG. 2A, electronic control unit 112 reads the sensed position and in the variation of FIG. 2B, pass through electronic control unit 112' reads the sensed position and sends a CAN message of the sensed position to electronic control unit 112.) At 306, the control routine compares the sensed position with the stored closed position to determine if the access cover is in its closed position. If the sensed position matches the stored closed position, the control routine proceeds to 308 where it determines that the access cover is closed and then branches back to 302. If the sensed position does not match the stored closed position, the control routine proceeds to 310 where it determines that the access cover is ajar and takes an ajar action (or actions) as discussed below, and then branches back to 302.

Returning to 302, if the electronic control unit 112 is in its learn mode, the control routine branches to 312 where it reads the sensed position of the access cover 104 sensed by the associated variable position ajar sensor 102. The control routine then proceeds to 314 where it stores this sensed position in memory 114 of electronic control unit 112 as the stored closed position and then branches back to 302. Illustratively, the electronic control unit 112 transitions to its learn mode in response to the learn command, as discussed above.

Electronic control unit 112 in which the above described control routine is implemented (and also electronic control unit 112' in the variation of FIG. 2B) is or includes any of a digital signal processor (DSP), microprocessor, microcontroller, or other programmable device which is programmed with software implementing the above described control. It should be understood that alternatively it is or includes other logic devices, such as a Field Programmable Gate Array (FPGA), a complex programmable logic device (CPLD), or application specific integrated circuit (ASIC). When it is stated that the controller 112 performs a function or is configured to perform a function, it should be understood that the controller 112 is configured to do so with appropriate logic (such as in software programmed in controller 112, logic devices, or a combination thereof).

The ajar actions that electronic control unit 112 takes upon determining that an access cover is ajar depends at least in part on the particular access cover. Examples of ajar actions include:

Door or liftage ajar—turn interior lighting on;
Door ajar—deploy power side steps (in vehicles having power side steps)
Hood ajar—turn under hood lighting on;
Driver door or hood ajar—inhibit stop/start feature from shutting off engine (in vehicles having stop/start feature;
Trunk ajar—turn trunk lighting on;
Any ajar—inhibit remote start (in vehicles having remote start);
Any access cover becoming ajar—theft alarm alert;
Driver door becoming ajar with vehicle stopped and out of park—apply brakes; and
Driver door becoming ajar with ignition off—apply lock to steering wheel.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An automotive vehicle, comprising:
   at least one access cover movable between first and second positions;
   a variable position ajar sensor that senses a position of the access cover at least along a path between the first position and a third position that is between the first and second positions;
   an electronic control unit having a normal mode and a learn mode;
   the electronic control unit when in the normal mode configured to respond to a position of the access cover sensed by the variable position ajar sensor, compare the sensed position to a stored closed position stored in a memory of the electronic control unit and determine that the access cover is closed when the sensed position matches the stored position and that the access cover is ajar when the sensed position does not match the stored position;
   the electronic control unit when in the learn mode configured to respond to a position of the access cover sensed by the variable position ajar sensor and store that position in the memory of the electronic control unit as the stored closed position; and
   the electronic control unit configured to be responsive to a user input to transition between the normal mode and the learn mode, wherein the user input is one of:
      a diagnostic command received on a communications bus of the vehicle to which the electronic control unit is coupled to transition from the normal mode to the learn mode; and
      a signal from a user actuated switch coupled to the electronic control unit.

2. The automotive vehicle of claim 1 wherein the variable position ajar sensor includes a variable resistor having a wiper electrically coupled to the electronic control unit and mechanically coupled to the access cover that moves in response to movement of the access cover wherein a resistance of the variable resistor varies in response to movement of the access cover wherein the resistance of the variable resistor is indicative of the position of the access cover.

3. The automotive vehicle of claim 1 wherein the variable position ajar sensor includes a variable resistor having a wiper electrically coupled to a pass through electronic control unit and mechanically coupled to the access cover that moves in response to movement of the access cover wherein a resistance of the variable resistor varies in response to movement of the access cover wherein the resistance of the variable resistor is indicative of the position of the access cover and the pass through electronic control unit is configured to send a message that includes the sensed position to electronic control unit that has the normal and learn modes via a communication bus to which the electronic control units are coupled.

4. The automotive vehicle of claim 1 wherein the access cover is any of a door, a hood, a trunk lid, or a lift-gate.

* * * * *